(No Model.)  2 Sheets—Sheet 1.
J. M. POOLE, Jr.
ROLLER GRINDING MILL.
No. 269,459. Patented Dec. 19, 1882.
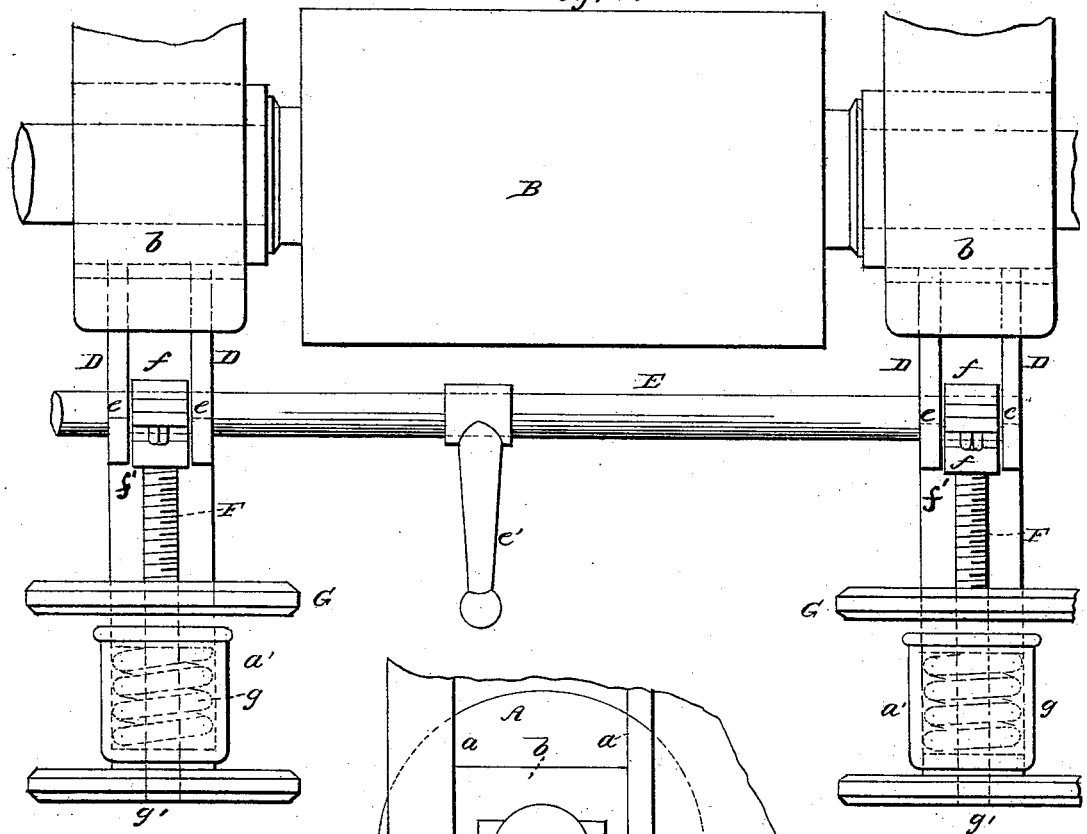
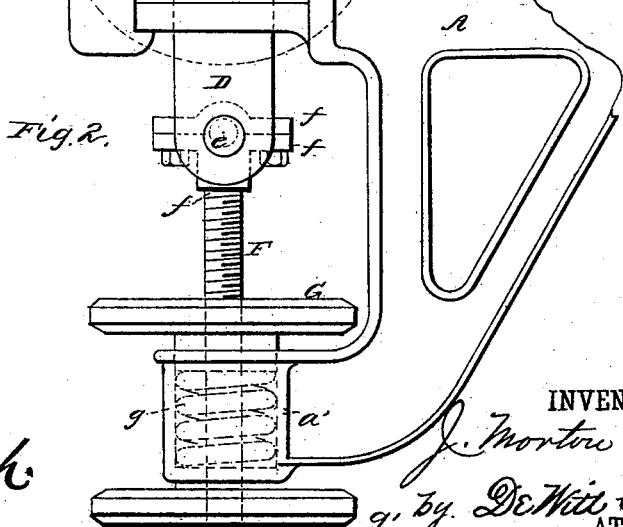
WITNESSES:
Fred. G. Dieterich
J. G. Hinkel
INVENTOR.
J. Morton Poole Jr
by DeWitt C. Allen
ATTORNEY (No Model.) 2 Sheets—Sheet 2.
J. M. POOLE, Jr.
ROLLER GRINDING MILL.
No. 269,459. Patented Dec. 19, 1882.
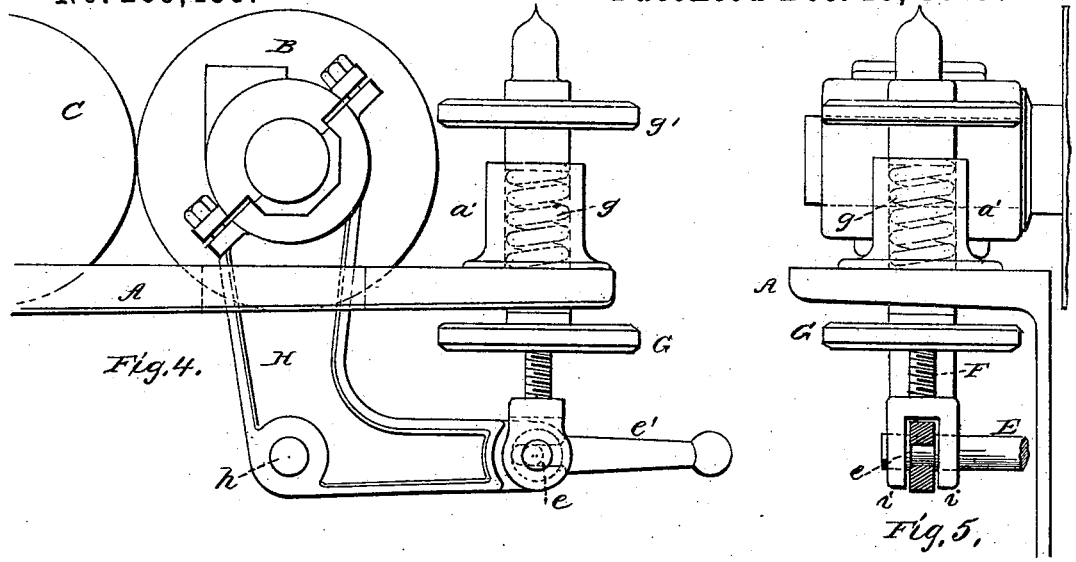
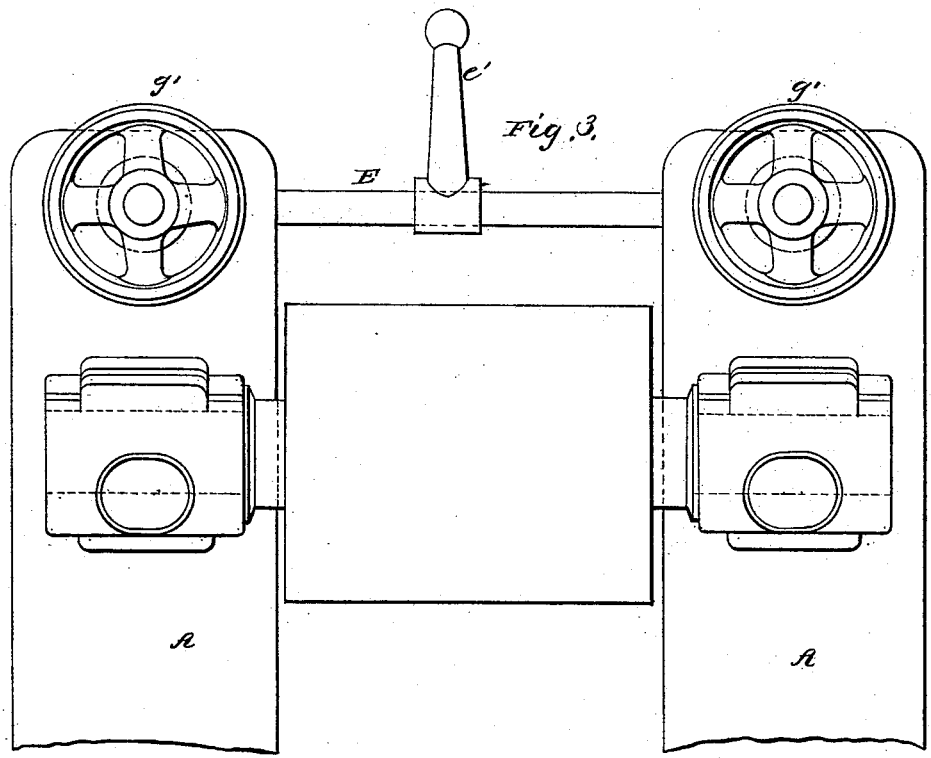
WITNESSES:
Fred. G. Dieterich
J. G. Hinkel
INVENTOR.
J. Morton Poole Jr
by DeWitt C. Allen
ATTORNEY

UNITED STATES PATENT OFFICE.

J. MORTON POOLE, JR., OF WILMINGTON, DELAWARE, ASSIGNOR TO THE J. MORTON POOLE COMPANY, OF SAME PLACE.

ROLLER GRINDING-MILL.

SPECIFICATION forming part of Letters Patent No. 269,459, dated December 19, 1882.

Application filed September 25, 1882. (No model.)

*To all whom it may concern:*

Be it known that I, J. MORTON POOLE, Jr., a citizen of the United States, residing at Wilmington, in the county of New Castle and State of Delaware, have invented certain new and useful Improvements in Roller Grinding-Mills; and I do hereby declare the following to be a full, clear, and exact description of the invention, such as will enable others skilled in the art to which it appertains to make and use the same.

This invention relates to certain new and useful improvements in roller grinding-mills, more especially designed for the reduction of grain and the products derived therefrom; and the invention has for its object the production of a roller-mill in which the movable roller bearings of single or double mills may be moved toward and from the stationary roller or rollers in starting or stopping the rollers without moving, changing, or affecting in any manner the yielding mechanism of the movable roller bearings when it has been properly adjusted; and to this end the invention consists in the combination and arrangement of parts for obtaining the above desired results, all as will be hereinafter fully described, and set forth in the claims hereto annexed.

Referring to the accompanying drawings, which consist of two sheets, Figure 1 represents a top view or plan; Fig. 2, a side elevation of Fig. 1, showing in plain and dotted lines the adjusting mechanism for one end of the movable roller; Fig. 3, a top view or plan, showing my improvements as used in connection with the rocking bearings for the movable roller; Fig. 4, a side elevation of the same; Fig. 5, an end view, partially in section.

In the drawings, A represents the frame of a roller grinding-mill, B the movable roller, and C the stationary roller. (Only partially shown in Fig. 4.) The movable roller B is journaled in adjustable bearings *b*, which slide in the usual ways, *a*, of the frame A toward and from the stationary roller. These sliding or movable bearings are provided with extension-bars D D. (See Fig. 1.) A transverse shaft, E, is provided with eccentrics *e e* near its ends, which work in bearings formed through the outer ends of the bars D D, and by means of which the movable roller bearings may be moved toward or from the stationary roller bearings by turning said shaft through the medium of a lever, *e'*, which may be secured thereto at any convenient point that may be readily accessible for the operator or attendant of the mill.

F represents the usual adjusting-screws, which are loosely mounted at their inner ends upon the shaft E by means of the bearing-plates *f*, composed of two parts, secured together and to the adjusting-screws by interior screw-threaded sleeves, *f'*. These adjusting-screws are provided with the usual hand-wheels, G, by which they may be turned for adjusting the movable roller bearings and regulating the tension of the springs *g*, arranged in housings *a'* of the frame A, which surround the unthreaded portions of said screws and are interposed between the hand-wheels and the outer bearing-plates, *g'*.

By the above-described arrangement of parts the roller B is adapted to be moved a short distance toward or from the stationary roller through the medium of the bars D D and the eccentrics working in the ends of said bars by slightly turning the shaft E in either direction to accord with the direction it is desired to move said roller. In this manner the movable roller can be easily and quickly separated from the stationary roller and returned to its original position when it is desired to start or stop the rollers without moving, changing, or interfering with the tension of the springs, thereby obviating any readjustment of the screws or the springs after they have been properly adjusted to determine the proper distance between the movable and stationary rollers or the tension of the springs, which serve to bring and hold the bearings and rollers as closely together as the screws will permit, while at the same time allowing the movable roller to recede from the stationary roller when any hard substance of improper size enters between the rollers.

Figs. 3, 4, and 5 represent a similar arrangement of parts when the movable roller is arranged in rocking bearings secured to the upper ends of bell-crank levers H, which are fulcrumed at $h$ to the frame of the machine, and their free ends provided with suitable bearings through them for the eccentrics $e\ e$ to work in. These eccentrics are mounted on the transverse shaft E, and the adjusting-screws are provided with bifurcated arms $i\ i$ at their inner ends, through which said shaft E passes, thus forming the connection between the rocking roller-bearings and the yielding mechanism, which is the same as heretofore described in Figs. 1 and 2.

The last-described arrangement is susceptible of a much nicer and easier adjustment of the yielding mechanism of the movable bearings of the movable roller and movement of the movable roller toward or from the stationary roller, when it is desired to start or stop the rollers, without moving, changing, or interfering with the yielding mechanism when it has been properly adjusted, as heretofore fully described.

It will be observed that the yielding and adjusting mechanism always remains stationary when moving the movable roller toward or from the stationary roller through the medium of the eccentrics and connecting mechanism, thereby obviating any tendency of the adjusting and yielding mechanism getting out of order. By my improved means of connecting and operating the movable roller in starting or stopping the mill the construction and operation of the parts are much simplified.

I am aware that eccentrics adapted to throw or move the movable roller of a roller grinding-mill toward or from the stationary roller without affecting the adjustment of the parts which control the position of the rolls when in operation is old, and such I do not wish to be understood as claiming broadly as of my invention.

Having thus fully described my invention, what I claim as new, and desire to secure by Letters Patent, is—

1. In a roller grinding-mill, the combination, with the movable roller bearings and the adjusting screws and springs, of the intermediate connecting and operating mechanism, consisting of the transverse shaft E, upon which the inner ends of the adjusting-screws are loosely mounted, and the eccentrics $e\ e$, mounted on said shaft and working in suitable bearings through the bars or levers connected to the movable roller bearings, constructed and arranged substantially in the manner as and for the purpose herein shown and described.

2. In a roller grinding-mill, the combination of the movable roller bearings, pivoted bell-crank levers having bearings through their free ends, the transverse rock-shaft having eccentrics working in said bearings of the bell-crank levers, the adjusting-screws having bifurcated arms, through which said shaft passes, and the springs, the several parts arranged relatively to each other substantially in the manner as and for the purpose herein shown and described.

In testimony whereof I affix my signature in presence of two witnesses.

J. MORTON POOLE, JR.

Witnesses:
A. F. DAWSON,
WM. T. PORTER.